United States Patent [19]

Lee

[11] Patent Number: 4,462,703
[45] Date of Patent: Jul. 31, 1984

[54] APPARATUS AND METHOD FOR CONTROLLING AND ORDERING CHINESE CHARACTERS

[76] Inventor: Hsing C. Lee, 219 W. 106th St., New York, N.Y. 10025

[21] Appl. No.: 333,336

[22] Filed: Dec. 22, 1981

Related U.S. Application Data

[63] Continuation-in-part of Ser. No. 95,620, Nov. 19, 1979, abandoned.

[51] Int. Cl.³ .............................................. B41J 3/06
[52] U.S. Cl. .................................. 400/110; 400/121; 400/484
[58] Field of Search ................. 400/83, 109, 110, 111, 400/121, 124, 125, 125.1, 484

[56] References Cited

U.S. PATENT DOCUMENTS

| | | | |
|---|---|---|---|
| 2,526,633 | 10/1950 | Brumbaugh | 400/110 |
| 2,613,795 | 10/1952 | Yutang | 400/110 |
| 2,950,800 | 8/1960 | Caldwell | 400/110 |
| 3,820,644 | 6/1974 | Yeh | 400/124 X |
| 4,159,471 | 6/1979 | Whitaker | 400/109 X |
| 4,228,507 | 10/1980 | Leban | 400/110 X |

FOREIGN PATENT DOCUMENTS 1398882  6/1975  United Kingdom ................ 400/110

OTHER PUBLICATIONS

"Basic Structure of the Chinese, Japanese, and Korean Languages", copyright 1946 by Leon H. Amdur, pp. 1–11.

Primary Examiner—Ernest T. Wright, Jr.
Attorney, Agent, or Firm—Lieberman, Rudolph & Nowak

[57] ABSTRACT

Apparatus and method for controlling and ordering Chinese characters wherein a Chinese character is formed from a set of form-strokes and the strokes which form the characters are divided into four basic stroke subsets. The stroke subsets include a horizontal stroke subset, a vertical stroke subset, a sloping stroke subset and a dot stroke subset along with associated turn and curve strokes. Strokes are further divided into two twin subsets, which are the elements of the Chinese ideograms. Ordering and controlling Chinese characters from the form-strokes permits the design and construction of simplified Chinese word processing, printing and communication devices and retrieval of information from mass storage of Chinese characters.

4 Claims, 6 Drawing Figures

| BASIC STROKES | TURN & CURVES | FIRST STROKE STARTING POINTS | STROKE TWINS | FORM-STROKES | | |
|---|---|---|---|---|---|---|
| — HORIZONTAL LINE (H) | ᗇ (TURN) ㄣ (CURVE RIGHT-WARD) ⪽ (DOUBLE TURN) | • AT THE TOP LEFT (NO OTHER LINE WILL BE HIGHER) IS (H),(HT),(HC),(HTT) • AT OTHER POINTS IS (H'),(HT'),(Hc') | — (H) — (H') | — | H | 1 |
| | | | | — | H' | 2 |
| | | | | ᗇ | HT | 3 |
| | | | | ᗇ | HT' | 4 |
| | | | | ㄣ | HC | 5 |
| | | | | ㄣ | HC' | 6 |
| | | | | ⪽ | HTT | 7 |
| ∣ VERTICAL LINE (V) | ⌋ HOOK LEFT ∣ CURVE RIGHT ⪽ DOUBLE TURN | • FROM THE TOP LEFT DOWNWARD IS (V),(Vh),(VT),(VTT) • OTHER IS (V'),(VH), (VT') | ∣ (V) ∣ (V') | ∣ | V | 8 |
| | | | | ∣ | V' | 9 |
| | | | | ⌋ | VH | 10 |
| | | | | ⌋ | VH' | 11 |
| | | | | L | VT | 12 |
| | | | | L | VT' | 13 |
| | | | | ⪽ | VTT | 14 |
| ╱ SLOPING LINE (S) | ( L 〈 ) | • ON LEFT OF CENTER IS (S) • ON RIGHT IS (S') | ╱ (S) ╱ (S') | ╱ | S | 15 |
| | | | | ╱ | S' | 16 |
| • DOT (D) | | • ABOVE H IS (D) • BESIDE H IS (D') | (D) (D') | • | D | 17 |
| | | | | • | D' | 18 |

FIG. 1

| WORDS | PINGYING (PHONETIC ALPHABET) | TRANSLATION | WRITING ORDER | |
|---|---|---|---|---|
| 大 | DA | BIG, LARGE | 一 ナ 大 | H'SS' |
| 犬 | QUAN | DOG | 一 ナ 大 犬 | H'SS'D |
| 太 | TAI | VERY, TOO | 一 ナ 大 太 | H'SS'D' |
| 工 | GONG | WORK, LABOR | 一 T 工 | HVH |
| 士 | SHI | GENTLEMAN | 一 十 士 | H'VH' |
| 土 | TU | EARTH, LAND | 一 十 土 | H'VH |
| 山 | SHAN | MOUNTAIN | ∣ 山 山 | V'VTV' |
| 李 | LI, LEE | FAMILY NAME, PLUM | 一 十 才 木 本 李 李 | H'VS'S'-HT'VH'H |

FIG. 2

APPARATUS AND METHOD FOR CONTROLLING AND ORDERING CHINESE CHARACTERS

RELATIONSHIP TO OTHER APPLICATIONS

This application is a continuation-in-part of application Ser. No. 095,620 filed Nov. 19, 1979, now abandoned.

FIELD OF THE INVENTION

This invention relates to a novel technique for controlling and ordering characters in the Chinese written language and more particularly to apparatus and method for controlling and ordering Chinese ideograms from a limited number of form-strokes comprising elements of Chinese ideograms.

BACKGROUND OF THE INVENTION

The written Chinese language consists of a large number of ideograms or characters with each ideogram representing a particular Chinese word. The modern squared style of Chinese writing became essentially fixed at the beginning of the first century and has changed little since that time.

The Chinese language is unique among modern languages due to the overwhelming number of individual characters absolutely necessary for everyday correspondence. For example, the K'ang-Hsi dictionary lists over 43,000 Chinese characters, modern high school or college dictionaries list between 10,000 and 15,000 characters and the Chinese telegraph code book contains over 9,000 characters, the minimum number deemed necessary for everyday correspondence.

The large number of Chinese characters required for even basic written correspondence has caused major problems for Chinese-using people in the modern world. This is particulary so because Chinese writing does not have an alphabet or a system for ordering words as do most languages. The problem primarily lies in the design of devices for word processing, printing or transmitting Chinese characters such as typewriters, typesetters, printing telegraphs and most recently computer devices. Due to the large number of characters involved, such devices have required enormously complicated keyboards without a commonly accepted simple order and code for the entry of information into and out of the devices. A prime example of this problem lies in the fact that in today's computerized world, a computer input and output device does not exist which is capable of controlling the minimum number of Chinese computer characters necessary for everyday correspondence in the business world. This fact has hindered the development of Chinese computer technology, and word processing devices, and forced reliance on various arbitrary coding techniques.

Many solutions to this problem have been proposed in the past, all of which attempt to identify the basic components of the Chinese character and then utilize the character components to put the complete characters in order and control them. One such solution is set forth in U.S. Pat. No. 2,613,795 granted to Lin Yutang on Oct. 14, 1952. This patent teaches the classification of Chinese characters into smaller groups by referring to the configuration of the character strokes at the top of the character and the configuration of the character strokes at the bottom of the character. Classification of the characters in this manner permits construction of a Chinese language keyboard, for use in a typewriter or the like, which has a relatively small number of keys in proportion to the number of characters that may be printed. More particularly, the teachings in this patent suggest the use of a keyboard having thirty-six (36) keys corresponding to the top configurations of the characters, twenty-eight (28) keys corresponding to the bottom configurations of the characters and eight additional keys for top/bottom selection, resulting in a total of 72 keys. Various keys are selected in combination to form or select complete Chinese characters.

This control system, although providing a partial solution to the problem, is still not entirely satisfactory in that 72 keys are required for character formation and the character must be selected from a character group. It is apparent that a system requiring fewer keys or character components to put all characters in order and control them would be superior to the system taught in this reference.

It is also to be noted that in contemporary Chinese typewriters, the user must memorize the position of individual characters on the character board.

It is therefore an object of the present invention to provide an ordering system for Chinese characters which permits character control from fewer character elements than the number of character components required in the prior art systems and without a need to select characters from a group.

It is a further object of the present invention to provide a method for controlling and ordering Chinese characters from a limited number of character components such that the construction of Chinese word processing devices is greatly simplified.

SUMMARY OF THE INVENTION

In accordance with the invention Chinese characters are identified from a set of form-strokes, elements of ideograms, without confusion when compared with the alphabets of phonetic languages.

It is a feature of the invention that four stroke subsets include a horizontal stroke subset, a vertical stroke subset, a sloping stroke subset and a dot stroke subset along with variations thereof.

It is a further feature of the invention that each kind of stroke is differentiated into twin strokes.

It is a still further feature of the invention that reducing Chinese characters to a limited number of form-stroke subsets greatly facilitates the design and construction of oriental word processing devices and the retrieval of information.

The foregoing and other objects and features of this invention will be more fully understood from the following description of an illustrative embodiment thereof taken in conjunction with the accompanying drawing.

BRIEF DESCRIPTION OF THE DRAWING

In the Drawing:

FIG. 1, illustrates the form-stroke subsets utilized in the control and order of Chinese characters in accordance with the invention, FIG. 2, illustrates the construction of several Chinese characters through utilization of the form-strokes.

DETAILED DESCRIPTION

Modern Chinese characters consist essentially of a number of different storkes such as straight lines, curves, and dots, arranged within a rectangular area, with each combination of strokes forming a different Chinese character. It has been determined that the set of elements making up a Chinese character can be reduced to four basic kinds of stroke subsets with each subset containing a predetermined number of form-strokes. The four basic types of strokes, referred to hereinafter as stroke subsets, are illustrated in FIG. 1 and consist of a Horizontal line (H), a Vertical line (V), a Sloping line (S) and a dot (D). From these four basic stroke subsets a number of additional form-strokes are formed and included in each subset.

Referring to FIG. 1, it can be seen that the Horizontal (H) subset includes seven form-strokes. The (H) form strokes are:

1. (H)—Basic horizontal form-stroke.
2. (H')—(H) form-stroke "twin" (discussed hereinafter).
3. (HT)—Basic horizontal form-stroke with a downward turn.
4. (HT')—(HT) form-stroke "twin" (discussed hereinafter.
5. (Hc)—Basic horizontal form-stroke with a curve rightward.
6. (Hc')—(Hc) form-stroke "twin" (discussed hereinafter.
7. (HTT)—Basic horizontal form-stroke with a double turn downward.

The Vertical (V) subset similarly includes seven form-strokes as follows:

8. (V)—Basic vertical form stroke.
9. (V')—(V) form-stroke "twin" (discussed hereinafter).
10. (VH)—Basic vertical form-stroke with hook leftward.
11. (VH')—(VH) Form-stroke "twin" (discussed hereinafter).
12. (VT)—Basic vertical form-stroke with a curve downward.
13. (VT)—(VT) form-stroke "twin" (discussed hereinafter.
14. (VTT)—Basic vertical form-stroke with a double turn downward.

The Sloping (S) Subset includes only two form-strokes as follows:

15. (S)—Basic sloping line, either sloping to the right or left.
16. (S')—(S) form-stroke "twin" (discussed hereinafter).

Similarly the Dot (D) subset includes two form-strokes as follows:

17. (D)—Basic dot form-stroke.
18. (D')—(D) form-stroke "twin" (discussed hereinafter).

Figure 4A:
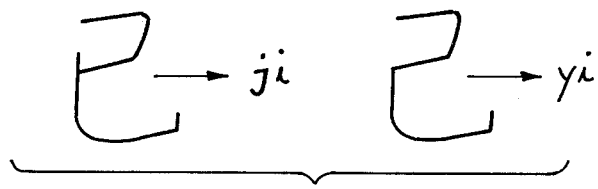
FIGS. 4A and 4B illustrate two (2) characters which are not readily identified in accordance with the instant invention.
Figure 4B:
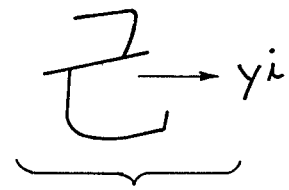

The foregoing 18 form strokes can be used to control and order all of the Chinese characters with the exception of two characters ji, yi shown in FIG. 4A. Representation of these two characters would require additional rules not deemed necessary. Moreover, the character yi can be depicted in another style, as shown in FIG. 4B. Also, shown in FIG. 1, beside the Sloping (S) form-stroke subset, and in the "Turns and Curves" column are two additional types of Sloping form-strokes. These two form-strokes are an (S) with a turn to the right and an (S) with a turn downward. These form-strokes can be treated as two independent form-strokes or, preferably as a simple (S) form-stroke. And the HTT and VTT form strokes can combine as one without confusion but the order of words will not be very clear.

When writing Chinese characters each form-stroke is written independently and in sequence. The starting point of the first stroke in a particular character is of importance and to ensure a proper starting point the "twin" form-strokes referred to above are utilized. More particularly for form-strokes in the (H) subset, the (H), (HT), (Hc) and (HTT) form-strokes must begin at the top left of the square in which the completed character is to be formed and no other form-stroke will be higher. The (H'), (HT'), and (Hc') "twin" form-strokes are those which began at other points in the square and will generally be lower than the corresponding (H) form strokes. Similarly with the (V) Subset, the (V), (VH), (VT) and (VTT) form-strokes begin at the top-left of the square moving downward while the "twin" form strokes (V'), (VH') and (VT'), are those which begin at other points in the square. In the (S) subset the (S) form-strokes begin at the top of the square to the right of center. The (D) subset requires that the (D) form-stroke be placed above a following (H) form-stroke and the "twin" (D') form-stroke be placed beside or following an (H) form-stroke. The foregoing description is also set forth in abbreviated form in FIG. 1 under the column, entitled "First Stroke Starting Points".

Strokes subsequent to the first form-stroke are identified according to the following rules which are classified only according to the form-strokes.

1. (H)—Horizontal line stroke starts from the left side or will reach the right side of the square and the stroke length is more than half of the width of the square. (H')—The stroke does not reach either side, or is shorter than half of the width of the square. (H with serif hook is treated as H or H' accordingly.)
2. (V)—Vertical stroke starts from the top of the square, moves downward and is larger than half of the height or square. (V')—Stroke does not start from the top or is shorter than half the square. (Vertical form-stroke with rightward hook is V or V' accordingly).
3. (S)—The stroke starts from the top and follows the rules for first strokes. (S')—All the sloping strokes not starting from the top are (S').
4. (D)—All the dot strokes above H are D and under are D'.

Utilization of the 18 form-strokes in conjunction with the rules set forth above permit a clear ordering of complete Chinese characters which compare with the dictionary order of English. FIG. 2 illustrates the elements of ideograms of several Chinese characters formed in accordance with the instant invention. More particularly, the Chinese word da (phonetic alphabet) is formed through utilization of the (H'), (S), and (S') form-strokes. Similarly the Chinese word shan (phonetic alphabet) is formed through utilization of the (V'), (VT') and (V') form-strokes. The examples given in FIG. 2 readily illustrate that the order of complete Chinese characters is easily accomplished in accordance with the teachings of the instant invention.

Figure 3:
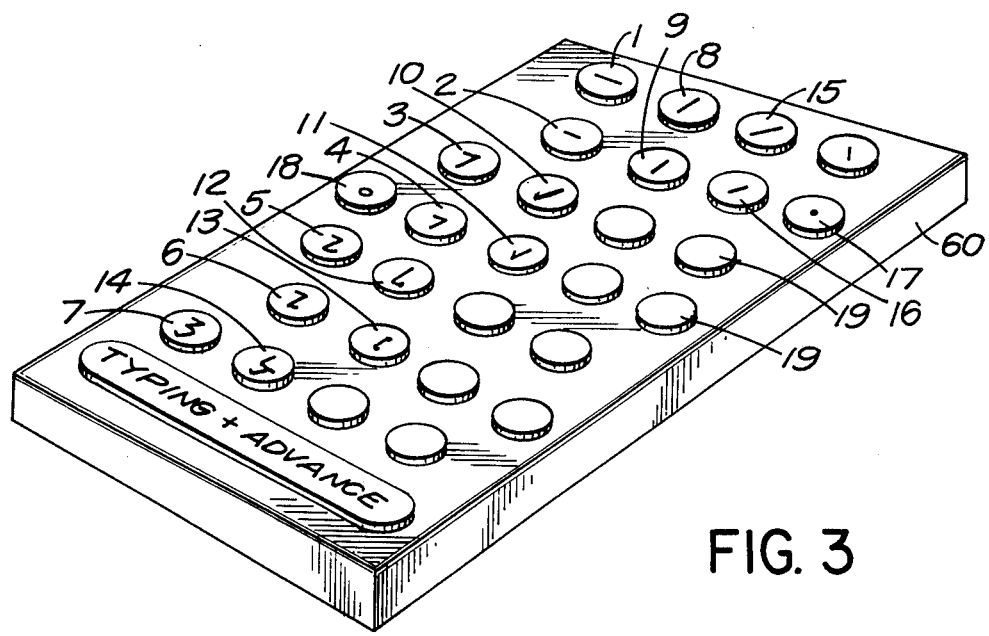
FIG. 3, illustrates a keyboard incorporating the form-strokes for use with a Chinese word processing, printing or communications device.
Figure 5:
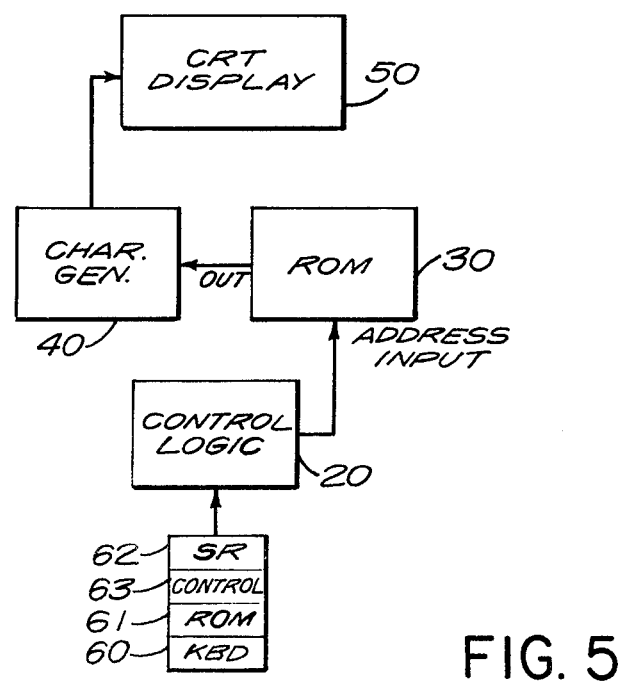
FIG. 5, shows a system for use with one embodiment of the invention.

It is apparent that use of the method set forth above would enable construction of word processing devices, typewriters, photosetting apparatus and computer input and output devices which would only require 18 form-stroke elements to control Chinese characters. The 5 form-stroke elements would be arranged in the order according to FIG. 1 from top to bottom described above and would be embodied in the form of keys on a keyboard for entering information in word processing communication devices and be embodied as devices controlling complete Chinese characters. One suggested keyboard format is shown in FIG. 3. FIG. 3 shows a keyboard 60 having 18 form-stroke keys (elements) which are shown to correspond with the seven Horizontal form-strokes, the seven Vertical form-strokes, the two Sloping form-strokes and the two Dot form-strokes, and which are identified in accordance with the table of FIG. 1. These 18 form-stroke keys are shown in the drawing with corresponding markings, such as keys 8 and 15 which correspond to form-strokes (V) and (S), respectively. Additional keys are also shown which could be utilized to perform necessary control functions or utilized for numeric symbols as discussed below. Such additional keys, such as keys 19 are shown to be blank, but could be provided with any appropriate marking indicative of their respective functions. Keyboard 60 in FIG. 3 has included therein a binary word generator (not shown in this figure) which generates a unique binary word for each of the keys 1-19 on keyboard 60, both form-stroke keys 1-18 and control keys 19. Referring for the moment to FIG. 5, such generators are well known and could consist, for example, of a Read Only Memory (ROM) 61, a shift register 62 and a control unit 63. In operation ROM 61 would be addressed each time a key on keyboard 60 is activated and a binary word unique to the activated key would be placed in shift register 62 under control of control unit 63 for later use as discussed hereinafter.

FIG. 5 is a function block diagram showing one embodiment of the invention for controlling and ordering Chinese characters. More particularly, a ROM 30 is shown and may be a large size read-only memory of a conventional type which has stored therein a unique binary word for each Chinese character and for combinations of Chinese characters which, when combined, form a Chinese word. The number of such words stored would vary for particular applications but it is understood that ROM 30 may have sufficient capacity to store information pertaining to as many as 43,000 characters, including combined characters. Alternatively, ROM 30 can be adapted to store information on each character contained in the K'ang-Hsi dictionary, or as few as 9,000 characters, or the number of characters contained in the Chinese telegraph code book, or any other number of characters necessary for the particular application anticipated by the user of the invention. It is also understood that although ROM 30 has been described as a storage memory, any type of addressable bulk storage arrangement can be incorporated into an embodiment of the invention by persons of skill in the art.

All character information stored in ROM 30 would be arranged according to the instant invention's control and ordering system. More particularly, information pertaining to characters containing basic horizontal form-strokes would be stored in a first position of the memory, all information pertaining to characters containing a basic horizontal form-stroke, followed by sloping line form-stroke would be stored in a first subset of the first position, all information relative to characters containing a basic horizontal form-stroke, followed by a sloping line form-stroke, followed by a "turn" of the sloping line form-stroke would be stored in a second subset of the memory, etc. Memory addressing is arranged such that the first several bits of the memory address would access information pertaining to all characters, or to units of combined characters, having horizontal form-strokes. The following several bits, in combination with the first bits would access the information of all characters having horizontal form-strokes followed by sloping line form-strokes, etc. In this manner, the information of each character which is stored in the memory is accessed in direct correspondence with the particular combination of form-strokes contained in the relevant character. For example the character "DA", shown in FIG. 2, would be accessed within ROM 30 by a binary address indicative of the three form-strokes H', S and S', while the character "Quan" would be accessed by a binary address indicative of the form-strokes H', S, S' and D. It is also understood that the particular manner of storage within the memory is unimportant as long as each character or combined character can be accessed by addressing in accordance with the instant invention.

In operation, the system shown in FIG. 5 functions in the following manner. A user, desiring to locate a particular Chinese character would type into keyboard 60 shown in FIG. 3 the unique combination of form-strokes from which the character is formed. As each key 1-18 is activated, in the proper order, a binary word is generated by the keyboard 60, applied to a control logic system which is designated as control logic 20 in FIG. 5. The binary word is stored in serial shift register 62 such that when all form-stroke keys 1-18 have been activated the complete binary word stored in the shift register 62 would be a combination of the words uniquely identifying the particular form-strokes from which the character is formed. At the time when all of the necessary form-stroke keys 1-18 which are required to locate a particular character have been activated, a particular control key 19 is activated, thereby automatically sending a signal to control logic 20 indicating that the character is complete. In response thereto control logic 20 applies the combined binary word to ROM 30, the combined binary word functioning as an address to retrieve from storage in ROM 30 the binary word representing the particular character identified by the unique combination of form-strokes. The particular binary word representing the retrieval character is than applied to a character generator 40. The character generator 40 can be a standard video character generator, well known in the art, which is capable of generating any particular form on a display 50 in response to particular binary inputs. Character generators of the type described herein are well understood in the art and will therefore not be described in detail in this disclosure. The output of the character generator 40 is applied to a CRT display 50 where the character retrieved from memory can be displayed.

"An example of the operation of the system can be shown by reference to the words "gong" (work labor) and "shi" (gentleman). More particularly, for the word "gong" three form-strokes are entered consisting of a horizontal, vertical and horizontal form-stroke being entered in sequence. The word "shi" consists of a horizontal twin form-stroke as the first form-stroke being entered followed by a vertical form-stroke, which in turn is followed by a second twin horizontal form-stroke.

In the instant invention there are two classes of form-strokes, which each class having two subsets. The two classes of form-strokes are (1) first form-strokes and (2) strokes subsequent to the first-strokes (subsequent strokes). Each class is then divided into two subsets, consisting of (1) a normal form-stroke and (2) a twin form-stroke. The first form-strokes are governed by the rules set forth in the specification and in FIG. 1 and the subsequent form-strokes are governed by the rules set forth above in the specification.

Each first form-stroke, and each subsequent form-stroke or strokes (both normal and twins) must be identified with an appropriate binary word such that the sequence HVH or H′V H′ will generate a unique character and not simply generate a second horizontal or horizontal twin form-stroke when that form-stroke is entered after the first form-stroke. Thus, the entry sequence for form-strokes of the instant invention are of particular significance as subsequent form-strokes, although being designated during entry in the same manner as the first form-stroke, will be placed within a particular character zone in a different position than a first form-stroke.

The ability to use the same form-stroke in a different position during the entry sequence to generate a completely different character results from the fact that the instant invention utilizes form-strokes consisting of recognizable elements forming standard Chinese characters and recognizes the particular importance of both position and scale of the form-strokes. It is understood, of course, that the control logic and/or computer utilized with the instant invention would make the determination between the first form-stroke and subsequent form-strokes. In this regard, the associated control logic and/or associated microprocessor would be programmed (or hard-wired) to recognize the entry of a character for a second, or subsequent, time during a particular entry sequence. Such an entry sequence would generate a unique character as described above, with a particular control key 19, being used to signal to completion of an entry sequence such that the character could be retrieved and/or displayed in accordance with the invention.

Although the foregoing disclosure describes a system which produces a display on a CRT, such is only one of many possible embodiments of the invention. It will be apparent to persons skilled in the art that the binary representation of the characters retrieved from ROM 30 could be used to drive any of several other known output devices, such as printing equipment whereby the invention is configured as a Chinese typewriter embodiment. Of course, persons skilled in the art would readily appreciate that ROM 30 could interface at its output with a computer for further processing, telecommunication equipment, or any other means of displaying and/or transferring information.

It should also be understood that although the instant invention was described with respect to retrieving information pertaining to a particular character from a ROM 30, the invention is obviously applicable to locating particular character information in any form of mass storage, including Chinese dictionaries. Thus, the instant invention is capable of ordering and controlling Chinese characters in a manner heretofore unattainable.

With the instant invention many things related to Chinese characters will change. Several such changes are listed below:
1. Chinese dictionaries will be simplified, and may be arranged according to the order of the elements of ideograms.
2. The indexing of books and periodicals will be much easier.
3. Learning, reading and writing will be easier and orderly.
4. Machines for Chinese-word processing and communications will be greatly improved.

For example: Simple typewriters for professional and family use will be readily developed as a 19 key keyboard (18 keys for the form-strokes and 1 for combined words) can control all Chinese characters. Auxiliary keys could also be added to increase the speed. Telegrams will not require arbitrary codes, teletypes will be simplified, and Chinese computer input and output machines will become possible.

Although a specific embodiment of this invention has been shown and described it will be understood that various modifications may be made without departing from the spirit or exceeding the scope of the claimed invention.

What is claimed is:

1. Apparatus for producing electrical signals corresponding to Chinese characters, said Chinese characters being formed of one or more form-strokes with each individual form-stroke being represented by a unique form-stroke identification element, said apparatus comprising:

first memory means for storing information pertaining to a plurality of individual first form-stroke identification elements corresponding to horizontal line, vertical line, sloping line and dot form-strokes respectively corresponding twin form-stroke identification elements, and respectively corresponding subsequent form-stroke identification elements, corresponding ones of the first form-strokes, said twin form-strokes and said subsequent form-strokes having a predetermined relationship with respect to relative dimension and location within a predetermined character zone, whereby said first horizontal line form-strokes begin at the upper left portion of said predetermined character zone and are higher than said horizontal line twin form-strokes, said first vertical line form strokes extending vertically for a distance greater than one-half of a height dimension of said predetermined character zone, while said vertical line twin form-strokes extend vertically for a distance shorter than one-half of said height dimension, said first sloping line form-strokes extending slopingly downwardly in said predetermined character zone, said first dot form-strokes being selectively arranged above, below and beside said first horizontal and said horizontal twin form-strokes and said respectively corresponding subsequent form-stroke identification elements selectively appearing in a different location within said predetermined character zone than said first form-stroke identification elements;

serial storage means for combining selected ones of said individual form-stroke identification elements, twin form-stroke identification elements and subsequent form-stroke identification elements which correspond to a selected Chinese character into a form-stroke address, said serial storage means including means for generating a unique form-stroke address dependent upon an entry sequence for said form-stroke identification elements, said corresponding twin form-stroke identification elements and said corresponding subsequent form-stroke identification elements, and second memory means responsive to said form-stroke address for producing a signal corresponding to said selected Chinese character, said signal corresponding to information stored in a memory location identified by said form-stroke address, there being included within said second memory means a large number of memory locations containing information pertaining to a corresponding number of respective Chinese characters.

2. Apparatus in accordance with claim 1 wherein there is further provided a plurality of form-stroke and twin form-stroke keys for controlling said first memory means, each of said keys having a symbol thereon representing an associated one of said form-strokes and said twin form-strokes, said first memory means being responsive to actuation of one or more of said form-stroke and twin form-stroke keys for transmitting said information pertaining to said plurality of individual form-stroke and twin form-stroke identification elements to said serial storage means.

3. A method of producing an address code corresponding to a selected Chinese character, the Chinese character being formed of one or more form-strokes, the method comprising the steps of:

defining the form-strokes into a predetermined plurality of form-stroke subsets corresponding to a horizontal form-stroke subset specifying first stroke form-strokes which begin at the upper left of a character zone, a vertical form-stroke subset specifying first stroke form-strokes which begin at the top left of said character zone and move downward, a sloping form-stroke subset specifying first stroke form-strokes which begin at the top of said character zone and to the left of the center thereof, and a dot form-stroke subset specifying form-strokes which are selectively arranged above, below and beside a horizontal form-stroke;

defining a predetermined twin form-stroke subset for each of said plurality of form-stroke subsets, each of said twin form-stroke subsets corresponding respectively to said horizontal vertical, sloping, and dot twin form-strokes having predeterminable relationships with their respectively associated form-strokes selectably with respect to relative dimension and location within said character zone, defining a predetermined subsequent form-stroke subset for each of said plurality of form-stroke subsets, each of said subsequent form-stroke subsets corresponding respectively to said horizontal, vertical, sloping, and dot form-strokes having a predeterminable relationships with their respectively associated form-strokes selectably with respect to relative dimension and location with said character zone;

selecting sequentially ones of said form-strokes, twin form-strokes and subsequent form-strokes corresponding to the selected Chinese character whereby form-stroke information codes corresponding to said sequentially selected ones of said form-strokes, twin form-strokes and subsequent form-strokes are created to form an address code; and utilizing said address code to access a character information storage device, said address code specifying a location in said character information storage device, said location containing character information pertaining to said selected Chinese characters.

4. A method for selecting a particular Chinese character from a plurality of Chinese characters, the method comprising the steps of, defining a predetermined plurality of form-strokes comprising said particular Chinese character, said form-strokes generally comprising a first horizontal, a first vertical, a first sloping and a dot form-stroke with corresponding twin form-stroke subsets, and corresponding subsequent form-stroke subsets and selectively combining individual form-strokes from said form-stroke, twin form-stroke and subsequent form-stroke subsets to select said particular Chinese character, said individual form-strokes being defined and combined in accordance with their position, scale and relative dimension within a preestablished character zone and said form-strokes consisting of recognizable elements from a standard Chinese character, said first form-strokes and said twin form-strokes including horizontal first stroke form-strokes beginning at a top left portion of said preestablished character zone with no other form-strokes being higher and horizontal twin form-strokes beginning at any point in said preestablished character zone, vertical first stroke form-strokes beginning at a top left portion of said preestablished character zone and extending downward and vertical twin form-strokes beginning at any point in said preestablished character zone, sloping first stroke form-strokes beginning at a point left of center of said preestablished character zone and sloping twin form-strokes beginning at any point in said preestablished character zone and dot form-strokes being selectively arranged above, below and beside said horizontal form-strokes, said subsequent form-stroke subset including horizontal subsequent form-strokes beginning at the left side and extending to the right side of said preestablished character zone and being longer than half of the width of said preestablished character zone, and being longer than half of the width of said preestablished character zone and horizontal subsequent twin form-stroke being shorter than half the width of said preestablished character zone, vertical subsequent form-strokes beginning at the top and extending vertically for a distance greater than one-half of the height dimension of said preestablished character zone and vertical subsequent twin form-strokes extending vertically for a distance less than one-half of said height dimension, sloping subsequent form-strokes extending sloping downwardly from the top of said preestablished character zone and sloping subsequent twin form-strokes beginning at a point other than the top of said preestablished character zone and dot subsequent form-strokes being selectively arranged above, below and beside said horizontal first stroke, subsequent, and twin form-strokes.

* * * * *